United States Patent
Febbo et al.

(10) Patent No.: US 11,932,306 B2
(45) Date of Patent: Mar. 19, 2024

(54) TRAJECTORY PLANNER

(71) Applicant: Honda Motor Co., Ltd., Tokyo (JP)

(72) Inventors: Huckleberry Febbo, Los Gatos, CA (US); Jiawei Huang, San Jose, CA (US); David Francis Isele, Sunnyvale, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 883 days.

(21) Appl. No.: 16/903,976

(22) Filed: Jun. 17, 2020

(65) Prior Publication Data
US 2021/0078592 A1 Mar. 18, 2021

Related U.S. Application Data (60) Provisional application No. 62/900,483, filed on Sep. 14, 2019.

(51) Int. Cl.
*B62D 15/02* (2006.01)
*B60W 60/00* (2020.01)
(Continued)

(52) U.S. Cl.
CPC ......... *B62D 15/025* (2013.01); *B60W 60/001* (2020.02); *G06F 18/2415* (2023.01);
(Continued)

(58) Field of Classification Search
CPC . B62D 15/025; B62D 15/021; B60W 60/001; B60W 2420/42; B60W 2420/02;
(Continued)

(56) References Cited

U.S. PATENT DOCUMENTS 8,744,664 B2   6/2014 Day et al.
2003/0058111 A1   3/2003 Lee et al.
(Continued)

FOREIGN PATENT DOCUMENTS

EP        2476035        7/2012

OTHER PUBLICATIONS

A. H. Adiwahono et al., "Human tracking and following in dynamic environment for service robots," TEN CON 2017—2017 IEEE Region 10 Conference, 2017, pp. 3068-3073, doi: 10.1109/TENCON. 2017.8228388. (Year: 2017).
(Continued)

*Primary Examiner* — Thomas Ingram
(74) *Attorney, Agent, or Firm* — RANKIN, HILL & CLARK LLP (57) ABSTRACT

An autonomous vehicle capable of trajectory prediction may include a first sensor, a second sensor, a processor, a trajectory planner, a low-level controller, and vehicle actuators. The first sensor may be of a first sensor type and may detect an obstacle and a goal. The second sensor may be of a second sensor type and may detect the obstacle and the goal. The processor may perform matching on the obstacle detected by the first sensor and the obstacle detected by the second sensor, model an existence probability of the obstacle based on the matching, and track the obstacle based on the existence probability and a constant velocity model. The trajectory planner may generate a trajectory for the autonomous vehicle based on the tracked obstacle, the goal, and a non-linear model predictive control (NMPC). The low-level controller may implement the trajectory for the autonomous vehicle by driving vehicle actuators.

18 Claims, 4 Drawing Sheets

(51) Int. Cl.
  *G06F 18/2415* (2023.01)
  *G06N 3/08* (2023.01)
  *G06V 10/764* (2022.01)
  *G06V 10/82* (2022.01)
  *G06V 20/58* (2022.01)
  *G06V 40/10* (2022.01)

(52) U.S. Cl.
  CPC ............. *G06N 3/08* (2013.01); *G06V 10/764* (2022.01); *G06V 10/82* (2022.01); *G06V 20/58* (2022.01); *G06V 40/103* (2022.01); *B60W 2420/42* (2013.01); *B60W 2420/52* (2013.01); *B60W 2520/105* (2013.01); *B62D 15/021* (2013.01)

(58) Field of Classification Search
  CPC ....... B60W 2520/105; B60W 60/00272; G06F 18/2415; G06F 18/24155; G06N 3/08; G06N 7/01; G06V 10/764; G06V 20/58; G06V 40/103
  See application file for complete search history.

(56) References Cited

U.S. PATENT DOCUMENTS

| | | |
|---|---|---|
| 2006/0064203 A1 | 3/2006 | Goto et al. |
| 2007/0193798 A1 | 8/2007 | Allard et al. |
| 2010/0228419 A1 | 9/2010 | Lee et al. |
| 2011/0001813 A1 | 1/2011 | Kim et al. |
| 2011/0026770 A1 | 2/2011 | Brookshire |
| 2011/0085702 A1 | 4/2011 | Nevatia et al. |
| 2012/0316680 A1 | 12/2012 | Olivier, III et al. |
| 2013/0096698 A1 | 4/2013 | Ulyanov |
| 2013/0342652 A1 | 12/2013 | Kikkeri et al. |
| 2014/0032012 A1* | 1/2014 | Joshi ............... G05D 1/0257 701/1 |
| 2014/0324339 A1* | 10/2014 | Adam ................ G01S 13/726 701/519 |
| 2018/0129217 A1 | 5/2018 | Asada |
| 2018/0181137 A1 | 6/2018 | Choi et al. |
| 2018/0203124 A1 | 7/2018 | Izzat et al. |
| 2018/0213994 A1 | 8/2018 | Lee et al. |
| 2018/0300556 A1 | 10/2018 | Varerkar et al. |
| 2019/0310650 A1 | 10/2019 | Halder |
| 2019/0367022 A1 | 12/2019 | Zhao et al. |
| 2019/0377345 A1 | 12/2019 | Bachrach et al. |
| 2020/0064827 A1 | 2/2020 | Miller et al. |
| 2020/0401148 A1 | 12/2020 | Hong et al. |
| 2022/0024486 A1 | 1/2022 | Scott et al. |
| 2023/0252280 A1* | 8/2023 | Donderici ............ G06N 3/08 706/25 |
| 2023/0252728 A1* | 8/2023 | Marotta ............. G06T 17/00 345/419 |
| 2023/0252796 A1* | 8/2023 | Bao ................. G06V 20/58 382/103 |

OTHER PUBLICATIONS

Bohlmann, Karsten, et al. "Autonomous person following with 3D LIDAR in outdoor environment." Journal of Automation Mobile Robotics and Intelligent Systems 7.2 (2013): 24-29. (Year: 2013).
Office Action of U.S. Appl. No. 16/743,488 dated Jul. 28, 2022, 27 pages.
G Basset, Yunjun Xu, and OA Yakimenko. "Computing short-time aircraft maneuvers using direct methods." Journal of Computer and Systems Sciences International, 49(3):481-513, 2010.
John T Betts. Practical methods for optimal control and estimation using nonlinear programming, vol. 19. Siam, 2010.
Jeff Bezanson, Stefan Karpinski, Viral B Shah, and Alan Edelman. "Julia: A fast dynamic language for technical computing." arXiv preprint arXiv:1209.5145, 2012.
Bao Xin Chen, Raghavender Sahdev, and John K Tsotsos. "Integrating stereo vision with a cnn tracker for a person-following robot." In International Conference on Computer Vision Systems, pp. 300-313. Springer, 2017.
Akansel Cosgun, Dinei A Florencio, and Henrik I Christensen. "Autonomous person following for telepresence robots." In 2013 IEEE International Conference on Robotics and Automation, pp. 4335-4342. IEEE, 2013.
Iain Dunning, Joey Huchette, and Miles Lubin. "Jump: A modeling language for mathematical optimization." SIAM Review, 59(2):295-320, 2017.
Huckleberry Febbo. "NLOptControl." https://github.com/JuliaMPC/NLOptControl.jl, 2017.
Huckleberry Febbo. Real-time Trajectory Planning to Enable Safe and Performant Automated Vehicles Operating in Unknown Dynamic Environments. PHD thesis, 2019.
Huckleberry Febbo, Jiechao Liu, Paramsothy Jayakumar, Jeffrey L Stein, and Tulga Ersal. "Moving obstacle avoidance for large, high-speed autonomous ground vehicles." In American Control Conference, pp. 5568-5573, 2017.
Borna Ghannadi, Naser Mehrabi, Reza Sharif Razavian, and John McPhee. "Nonlinear model predictive control of an upper extremity rehabilitation robot using a two-dimensional human-robot interaction model." In International Conference on Intelligent Robots and Systems, pp. 502-507. IEEE, 2017.
J Gonzales, F Zhang, K Li, and F Borrelli. "Autonomous drifting with onboard sensors." In Advanced Vehicle Control, p. 133. CRC Press, 2016.
Andreas Griewank, David Juedes, and Jean Utke. Algorithm 755: "Adol-c: a package for the automatic differentiation of algorithms written in c/c++." ACM Transactions on Mathematical Software (TOMS), 22(2):131-167, 1996.
J. Huang, M. Demir, T. Lian, and K. Fujimura. "An online multi-lidar dynamic occupancy mapping method." In 2019 IEEE Intelligent Vehicles Symposium (IV), pp. 517-522, Jun. 2019.
Goran Huskić, Sebastian Buck, Luis Azareel Ibarguen Gonzalez, and Andreas Zell. "Outdoor person following at higher speeds using a skid-steered mobile robot." In 2017 IEEE/RSJ International Conference on Intelligent Robots and Systems (IROS), pp. 3433-3438. IEEE, 2017.
Christopher Jewison, R Scott Erwin, and Alvar Saenz-Otero. "Model predictive control with ellipsoid obstacle constraints for spacecraft rendezvous." IFAC-PapersOnLine, 48(9):257-262, 2015.
Matthew Kelly. "An introduction to trajectory optimization: How to do your own direct collocation." SIAM Review, 59(4):849-904, 2017.
Jason Kong, Mark Pfeiffer, Georg Schildbach, and Francesco Borrelli. "Kinematic and dynamic vehicle models for autonomous driving control design." IEEE Intelligent Vehicles Symposium, Proceedings, Aug. 2015: 1094-1099, 2015.
Krisada Kritayakirana and J Christian Gerdes. "Using the centre of percussion to design a steering controller for an autonomous race car." Vehicle System Dynamics, 50(sup1):33-51, 2012.
Angus Leigh, Joelle Pineau, Nicolas Olmedo, and Hong Zhang. "Person tracking and following with 2d laser scanners." In 2015 IEEE International Conference on Robotics and Automation (ICRA), pp. 726-733. IEEE, 2015.
Jiechao Liu, Paramsothy Jayakumar, Jeffrey L Stein, and Tulga Ersal. "A study on model fidelity for model predictive control-based obstacle avoidance in high-speed autonomous ground vehicles." Vehicle System Dynamics, 54(11):1629-1650, 2016.
Jiechao Liu, Paramsothy Jayakumar, Jeffrey L Stein, and Tulga Ersal. "Combined speed and steering control in high-speed autonomous ground vehicles for obstacle avoidance using model predictive control." IEEE Transactions on Vehicular Technology, 66(10):8746-8763, 2017.
Sikang Liu, Nikolay Atanasov, Kartik Mohta, and Vijay Kumar. "Search-based motion planning for quadrotors using linear quadratic minimum time control." In International Conference on Intelligent Robots and Systems, pp. 2872-2879. IEEE, 2017.
Sikang Liu, Kartik Mohta, Nikolay Atanasov, and Vijay Kumar. "Search-based motion planning for aggressive flight in se (3)." IEEE Robotics and Automation Letters, 3(3):2439-2446, 2018.

(56) References Cited

OTHER PUBLICATIONS

Kartik Mohta, Ke Sun, Sikang Liu, Michael Watterson, Bernd Pfrommer, James Svacha, Yash Mulgaonkar, Camillo Jose Taylor, and Vijay Kumar. "Experiments in fast, autonomous, gps-denied quadrotor flight." arXiv preprint arXiv:1806.07053, 2018.

Payam Nikdel, Rakesh Shrestha, and Richard Vaughan. "The hands-free push-cart: Autonomous following in front by predicting user trajectory around obstacles." In 2018 IEEE International Conference on Robotics and Automation (ICRA), pp. 1-7. IEEE, 2018.

Jong Jin Park and Benjamin Kuipers. "Autonomous person pacing and following with model predictive equilibrium point control." In 2013 IEEE International Conference on Robotics and Automation, pp. 1060-1067. IEEE, 2013.

Rajesh Rajamani. "Vehicle dynamics and control." Springer Science and Business Media, 2011.

Shaoqing Ren, Kaiming He, Ross B. Girshick, and Jian Sun. "Faster R-CNN: towards real-time object detection with region proposal networks." CoRR, abs/1506.01497, 2015.

Jarrett Revels. Reversediff. https://github.com/ JuliaDiff/ReverseDiff.jl, 2017.

Aine Ilina Tarmizi, Ahmad Zaki Shukor, Nur Maisarah Mohd Sobran, and Muhammad Herman Jamaluddin. "Latest trend in person following robot control algorithm: A review." Journal of Telecommunication, Electronic and Computer Engineering (JTEC), 9(3):169-174, 2017.

Francisca Vasconcelos and Nuno Vasconcelos. "Person-following uavs." In 2016 IEEE Winter Conference on Applications of Computer Vision (WACV), pp. 1-9. IEEE, 2016.

E Velenis, P Tsiotras, and J Lu. "Aggressive maneuvers on loose sur-faces: Data analysis and input parametrization." In 2007 Mediterranean Conference on Control & Automation, pp. 1-6. IEEE, 2007.

David Wooden, Matthew Malchano, Kevin Blankespoor, Andrew Howardy, Alfred A Rizzi, and Marc Raibert. "Autonomous navigation for bigdog." In 2010 IEEE International Conference on Robotics and Automation, pp. 4736-4741. IEEE, 2010.

Xiaojing Zhang, Alexander Liniger, and Francesco Borrelli. "Optimization-based collision avoidance." arXiv preprint arXiv:1711.03449, 2017.

Office Action of U.S. Appl. No. 16/743,488 dated Jan. 17, 2023, 33 pages.

Office Action of U.S. Appl. No. 16/743,488 dated Mar. 22, 2022, 46 pages.

Office Action of U.S. Appl. No. 16/743,488 dated Jun. 29, 2023, 31 pages.

International Search Report and Written Opinion of PCT/US2020/049666 dated Dec. 17, 2020, 9 pages.

Notice of Allowance of U.S. Appl. No. 16/743,488 dated Nov. 7, 2023, 17 pages.

\* cited by examiner

TRAJECTORY PLANNER

CROSS-REFERENCE TO RELATED APPLICATIONS

This application claims the benefit of U.S. Provisional Patent Applications, Ser. No. 62/900,483 entitled "TRAJECTORY PLANNER", filed on Sep. 14, 2019; the entirety of the above-noted application(s) is incorporated by reference herein.

BACKGROUND

One use-case for robotic platforms is transporting heavy or otherwise difficult payloads. An operator may guide a robot as they themselves navigate through difficult, unknown dynamic environments. An autonomous all-terrain vehicle (AATV) may be utilized as the robot to transport the heavy load. The robot may be required to meet many specifications for operation in an unknown dynamic environment. A wide variety of robotic platforms may utilize some form of following algorithm, including wheelchairs, unmanned aerial vehicles, legged robots, and skid steer platforms.

BRIEF DESCRIPTION

According to one aspect, a system for trajectory prediction may include a first sensor, a second sensor, a processor, a trajectory planner, a low-level controller, and one or more vehicle actuators. The first sensor may be of a first sensor type and may detect an obstacle and a goal. The second sensor may be of a second sensor type and may detect the obstacle and the goal. The second sensor type may be different than the first sensor type. The processor may perform matching on the obstacle detected by the first sensor and the obstacle detected by the second sensor. The processor may model an existence probability of the obstacle based on the matching. The processor may track the obstacle based on the existence probability and a constant velocity model. The trajectory planner may generate a trajectory for an autonomous vehicle based on the tracked obstacle, the goal, and a non-linear model predictive control (NMPC). The low-level controller may implement the trajectory for the autonomous vehicle by driving one or more of the vehicle actuators.

The first sensor may be an image capture sensor and the second sensor may be a light detection and ranging (LiDAR) sensor. The matching may be performed based on Hungarian matching. The existence probability may be modeled based on a Bayesian function. The tracking may be performed based on a Kalman filter. The NMPC may be modeled based on a constant initial time, a variable final time, a state, a number of states, a control, a number of controls, a desired initial state vector, an initial state tolerance vector, a desired final state vector, a final state tolerance vector, arrays of slack variables on the initial states and terminal states, and arrays of weights. The matching may be performed based on a cost function between the obstacle detected by the first sensor and the second sensor and the obstacle tracked by the processor. The cost function may be calculated based on constant weight terms, vehicle position coordinates, goal coordinates, a number set associated with minimizing singularities, a desired final heading angle, a steering angle, a steering rate, a longitudinal speed, and a longitudinal acceleration. The low-level controller may be a proportional-integral-derivative (PID) controller. The autonomous vehicle may be a front-wheel-steered vehicle.

According to one aspect, a method for trajectory prediction may include detecting an obstacle and a goal using a first sensor of a first sensor type, detecting the obstacle and the goal using a second sensor of a second sensor type, the second sensor type different than the first sensor type, performing matching on the obstacle detected by the first sensor and the obstacle detected by the second sensor via a processor, modeling an existence probability of the obstacle based on the matching via the processor, and tracking the obstacle based on the existence probability and a constant velocity model via the processor, generating a trajectory for an autonomous vehicle based on the tracked obstacle, the goal, and a non-linear model predictive control (NMPC) via a trajectory planner, and implementing the trajectory for the autonomous vehicle by driving one or more vehicle actuators via a low-level controller.

The first sensor may be an image capture sensor and the second sensor may be a light detection and ranging (LiDAR) sensor. The matching may be performed based on Hungarian matching. The existence probability may be modeled based on a Bayesian function. The tracking may be performed based on a Kalman filter. The NMPC may be modeled based on a constant initial time, a variable final time, a state, a number of states, a control, a number of controls, a desired initial state vector, an initial state tolerance vector, a desired final state vector, a final state tolerance vector, arrays of slack variables on the initial states and terminal states, and arrays of weights. The matching may be performed based on a cost function between the obstacle detected by the first sensor and the second sensor and the obstacle tracked by the processor. The cost function may be calculated based on constant weight terms, vehicle position coordinates, goal coordinates, a number set associated with minimizing singularities, a desired final heading angle, a steering angle, a steering rate, a longitudinal speed, and a longitudinal acceleration. The low-level controller may be a proportional-integral-derivative (PID) controller.

According to one aspect, an autonomous vehicle capable of trajectory prediction may include a first sensor, a second sensor, a processor, a trajectory planner, a low-level controller, and one or more vehicle actuators. The first sensor may be of a first sensor type and may detect an obstacle and a goal. The second sensor may be of a second sensor type and may detect the obstacle and the goal. The second sensor type may be different than the first sensor type. The processor may perform matching on the obstacle detected by the first sensor and the obstacle detected by the second sensor. The processor may model an existence probability of the obstacle based on the matching. The processor may track the obstacle based on the existence probability and a constant velocity model. The trajectory planner may generate a trajectory for the autonomous vehicle based on the tracked obstacle, the goal, and a non-linear model predictive control (NMPC). The low-level controller may implement the trajectory for the autonomous vehicle by driving one or more of the vehicle actuators.

DETAILED DESCRIPTION

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "mobile device", as used herein, may be a computing device typically having a display screen with a user input (e.g., touch, keyboard) and a processor for computing. Mobile devices include handheld devices, portable electronic devices, smart phones, laptops, tablets, and e-readers.

A "vehicle", as used herein, refers to any moving vehicle that is capable of carrying one or more human occupants and is powered by any form of energy. The term "vehicle" includes robots, cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants. The autonomous vehicle may be an autonomous all-terrain vehicle (AATV) and may be a front-wheel steered vehicle or other type of steered vehicle or robot.

A "vehicle system", as used herein, may be any automatic or manual systems that may be used to enhance the vehicle, driving, and/or safety. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

"Obstacle", as used herein, refers to any objects in a roadway or along a path being travelled by the vehicle and may include pedestrians, other vehicles, animals, debris, potholes, etc. Further, an 'obstacle' may include most any traffic condition, road condition, weather condition, features of the environment, etc. Examples of obstacles may include, but are not necessarily limited to other vehicles (e.g., obstacle vehicle), buildings, landmarks, obstructions in the roadway, road segments, intersections, etc. Thus, obstacles may be found, detected, or associated with a path, one or more road segments, etc. along a route on which the vehicle is travelling or is projected to travel along.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

Figure 1:
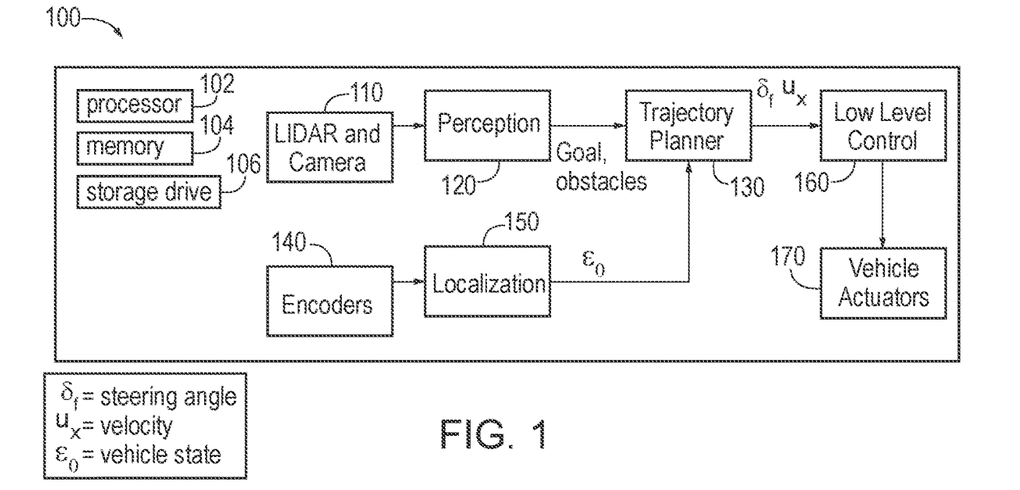
FIG. 1 is an exemplary component diagram of a system for trajectory planning, according to one aspect.

FIG. 1 is an exemplary component diagram of a system 100 for trajectory planning, according to one aspect. The system 100 for trajectory planning may be implemented as an autonomous vehicle capable of trajectory prediction according to one aspect. In any event, system 100 for trajectory planning may include a processor 102, a memory 104, a storage drive 106, a set of sensors 110 (e.g., a first sensor, a second sensor, etc.), a perception controller 120, a trajectory planner 130, one or more vehicle encoders 140, a localization controller 150, a low-level controller 160, and one or more vehicle actuators 170. It will be appreciated that any of the controllers described herein may be implemented as hardware or software or implemented via the processor 102, the memory 104, the storage drive 106, etc.

The set of sensors 110 may include the first sensor and the second sensor. The first sensor may be of a first sensor type and the second sensor may be of a second sensor type. The second sensor type may be different than the first sensor type. For example, the first sensor may be an image capture sensor, such as a stereo camera or monocular camera, and the second sensor may be a light detection and ranging (LiDAR) sensor. The image capture sensor may be mounted on a front of the autonomous vehicle. The LiDAR sensor may be mounted on a top and/or the front of the autonomous vehicle. The first sensor may detect an obstacle, such as a pedestrian, and a goal, such as a target or a human operator to follow. The first sensor may be a region-proposal based object detector, which may utilize a structure similar to Faster-RCNN. Further, the detector or the first sensor detection may be trained on a dataset to facilitate pedestrian detection. An output of the first sensor may include one or more bounding box locations of detected pedestrians or obstacles as well as a rough estimated distance to these corresponding pedestrians or obstacles.

The second sensor may detect the obstacle or the same obstacle as the first sensor and the goal or the human operator. In this way, the first sensor and the second sensor may detect the obstacle (or one or more obstacles) and the goal. The second sensor may be implemented to capture a Dynamic Occupancy Map (DOM). The capturing of the DOM may include the use of two or more LiDAR sensors mounted on the vehicle which may detect obstacles within a range of the vehicle. The output of the DOM may be a list of convex hulls for each detected obstacle, where each convex hull describes an obstacle's spatial dimensions.

The perception controller 120 may be implemented via the processor 102 and may perform matching on the obstacle and the goal detected by the first sensor and the obstacle and the goal detected by the second sensor. Stated another way, the perception controller 120 may implement perception algorithms to process data from the first sensor and the second sensor to generate estimates for the obstacles in the environment and the goal. In this way, the perception controller 120 may estimate the position and velocity of the person to be followed (e.g., goal, target, or operator), detect and/or determine the location and shape of any obstacle in the robot's surrounding area or operating environment. The perception controller 120 may define obstacles using a height inequality, such as any object>0.7 m above ground level, for example.

The vehicle encoders 140 may provide current speed data and current steering data from the autonomous vehicle to the localization controller 150. The localization controller 150 may execute a localization algorithm using data from the steering and speed encoders 140 to estimate the vehicles state using an odometry-based estimate.

Additionally, the processor 102 may model an existence probability of the obstacle based on the matching. The existence probability may be modeled based on a Bayesian function.

The processor 102 may track the obstacle and the goal based on the existence probability and a constant velocity model. The tracking may be performed based on a Kalman filter.

The trajectory planner 130 may be implemented via the processor 102 and may generate a trajectory for an autonomous vehicle based on the tracked obstacle, the goal or the human operator, and a non-linear model predictive control (NMPC). The NMPC may be modeled based on a constant initial time, a variable final time, a state, a number of states, a control, a number of controls, a desired initial state vector, an initial state tolerance vector, a desired final state vector, a final state tolerance vector, arrays of slack variables on the initial states and terminal states, and arrays of weights. As seen in FIG. 1, the trajectory planner 130 receives inputs from the set of sensors 110, the perception controller 120, vehicle encoders 140, and the localization controller 150 and generates the trajectory for the autonomous vehicle as a steering angle $\delta_f$ and a velocity $u_x$ when provided with the goal and tracked obstacles from the perception controller 120 and a vehicle state $\varepsilon_0$ from the localization controller 150. Together, the output from both the perception controller 120 and the localization controller 150 may establish the trajectory for the trajectory planner 130. As discussed above, the output of the trajectory planner 130 may be the desired steering angle $\delta_f$ and speed or velocity $u_x$, which may be fed to the low-level controller 160.

A variety of specifications may be met by modeling the NMPC accordingly because the trajectory planner 130 may generate the trajectory for the autonomous vehicle based on the NMPC. For example, the NMPC may include specification data or algorithms for following the goal (e.g., person following or target following), obstacle avoidance (e.g., collision mitigation for static obstacles and dynamic obstacles), operating instructions suitable for front-wheel steered vehicles and/or differential-drive vehicles, simultaneous or concurrent speed optimization and steering optimization, and control effort minimization.

The vehicle encoders 140 may provide current speed data and current steering data from the autonomous vehicle to the localization controller 150. The localization controller 150 may execute a localization algorithm using data from the steering and speed encoders 140 to estimate the vehicles state using an odometry-based estimate.

The low-level controller 160 may be a proportional-integral-derivative (PID) controller. The low-level controller 160 may implement the trajectory for the autonomous vehicle by driving one or more of the vehicle actuators 170 of the autonomous vehicle, which may be a front-wheel-steered vehicle. The autonomous vehicle may be configured to receive autonomous command messages over a Controller Area network (CAN) bus, for example. In any event, the low-level controller 160 may control a voltage associated with the autonomous vehicle's actuators, such as steering actuators and throttle actuators, for example.

In this way, a system or an autonomous vehicle capable of trajectory planning may be provided. According to one aspect, the system or autonomous vehicle may be efficient for a front-wheel steered vehicle and may be designed to follow a target, such as a target person, individual, or operator, while mitigating collisions with static obstacles and dynamic obstacles within known and/or unknown operating environments. The trajectory planner 130 may optimize speed and steering for the autonomous vehicle, while minimizing control effort by implementing the NMPC. An underling trajectory optimization problem may be approximated using a simultaneous method because NMPC may be utilized. Therefore, the system or autonomous vehicle capable of trajectory planning may be suitable for controlling a front wheel-steered autonomous vehicle to follow an operator or a target in off-road, unknown, dynamic environments.

Figure 2:
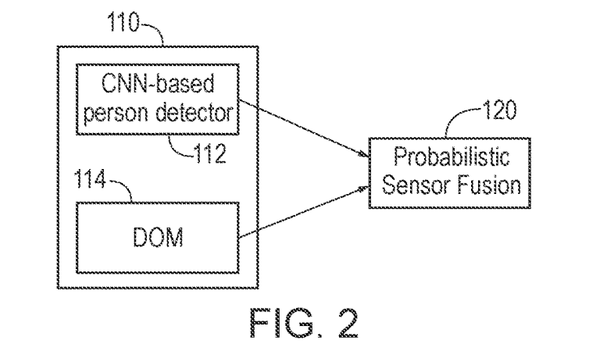
FIG. 2 is an exemplary component diagram of the perception controller of the system for trajectory planning of FIG. 1, according to one aspect.

FIG. 2 is an exemplary component diagram of the perception controller 120 of the system 100 for trajectory planning of FIG. 1, according to one aspect. As previously discussed, the set of sensors 110 may include an image capture sensor 112, an image capture device, LiDAR sensors 114, etc. Information from both of the sensors may be fused by the perception controller 120, which may perform probabilistic sensor fusion, thereby fusing the data from both sensors, thereby enabling objects of interest to be detected using two independent modules, systems, or sensors. In this way, merely a single input may be provided to the perception controller 120 of FIG. 3. The architecture of FIG. 2 enables the inputs 112, 114 to be combined such that a camera-based object or obstacle detection may be fused with the LiDAR-based dynamic occupancy map using the perception controller 120. The fusion of the information from both of these sensors may enable more robust obstacle and goal detection because the data from the image capture sensor may not be as positionally accurate as the LiDAR sensors and because the DOM may not include object categorization. Further, the fusion performed by the perception controller 120 may include missed or false detection tolerance to noisy detection inputs from either one of the first sensor and/or the second sensor.

Figure 3:
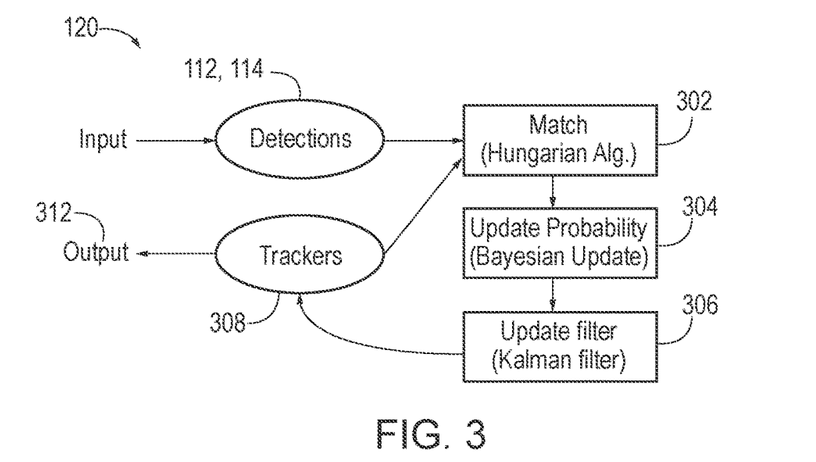
FIG. 3 is an exemplary component diagram of the perception controller of the system for trajectory planning of FIG. 2, according to one aspect.

FIG. 3 is an exemplary component diagram of the perception controller 120 of the system 100 for trajectory planning of FIG. 2, according to one aspect. FIG. 3 illustrates an exemplary diagram of a sensor fusion pipeline architecture from the system 100 for trajectory planning of FIG. 1.

The perception controller 120 may perform matching on the obstacle and the goal detected by the first sensor and the obstacle and the goal detected by the second sensor. In other words, the perception controller 120 may perform a matching between incoming detections (e.g., detected goal or detected obstacle) and existing tracked goals or tracked obstacles. The matching 302 may be performed based on Hungarian matching or the Hungarian algorithm. The matching 302 may be performed based on a cost function between the obstacle detected by the first sensor and the second sensor and the obstacle tracked by the processor 102.

The cost function may be calculated based on constant weight terms, vehicle position coordinates, goal coordinates, a number set associated with minimizing singularities, a desired final heading angle, a steering angle, a steering rate, a longitudinal speed, and a longitudinal acceleration.

According to one aspect, the cost function may be defined between a detection and tracker as follows:

LIDAR detections: the Euclidean distance between detection and tracker centers as the cost;

Camera detections: the pixel distance between the projection of a tracker onto an image plane and a bounding box center as a cost. The matching may yield three types of outcomes:

For a matched detection and tracker, the detection may be used to update the tracker;

For unmatched trackers, these may be updated with negative (e.g., empty) detection;

For unmatched detections, these may generate new trackers.

In order to seamlessly fuse the two types of detections from the first sensor and the second sensor, an existence probability $P_{exist}$ may be modeled 304 for each tracked object via the perception controller 120 or the processor 102. Regardless of the source of detections, each positive (e.g., matched) detection may increase the probability of the corresponding tracker, while each negative detection may decreases the probability of the corresponding tracker. By applying Bayes' Rule, the processor 102 may calculate the existence probability from inverse sensor model, P (existence j measurement). The processor 102 may adopt an inverse sensor model and assume certain false positive and false negative rates for each detection module or sensor. For objects outside a sensor's field of view, the processor 102 may maintain the $P_{exist}$ so it does not change.

The $P_{exist}$ may be utilized to create new trackers and delete obsolete trackers. A tracker may be created when the corresponding $P_{exist}$ exceeds a predefined high threshold. The tracker may be deleted when the corresponding $P_{exist}$ drops below a predetermined low threshold. Additionally, the position and the velocity of tracked pedestrians may be estimated using a Kalman filter 306 with a constant velocity model. In this fashion, the perception controller 120 may track 308 objects, obstacles, and/or the goal even when the object, obstacle, or goal leaves a field of view of one or more of the sensors.

According to one aspect, the trajectory planner 130 may build 312 the NMPC model according to a trajectory optimization problem (e.g., optimal control problem) which may be formulated to be efficient for a front-wheel steered vehicle, designed to follow a target or goal while mitigating collisions with static obstacles and dynamic obstacles within known and/or unknown operating environments. The NMPC may be built to fits into a single-phase, continuous-time, optimal control problem in a Bolza form tailored for the NMPC, given in Eq. 1-Eq. 8 as:

$$\text{minimize} \quad \xi(t), \varsigma(t), \xi_{o_s}, \xi_{f_s}, t_f \quad (1)$$

$$J = M(\xi(t_0), t_0, \xi(t_f), t_f) + \int_{t_0}^{t_f} L(\xi(t), \varsigma(t), t)dt + w_{s_0\xi_{0s}} + w_{s_f\xi_{fs}}$$

subject to

-continued $$\frac{d\xi}{dt}(t) - f(\xi(t), \varsigma(t), t) = 0 \quad (2)$$

$$C(\xi(t), \varsigma(t), t) \leq 0 \quad (3)$$

$$\xi_0 - \xi_{0_{tol}} \leq \xi(t_o) \leq \xi|_o + \xi_{0_{tol}} \quad (4)$$

$$\xi_f - \xi_{f_{tol}} \leq \xi(t_f) \leq \xi_f + \xi_{f_{tol}} \quad (5)$$

$$\xi_{min} \leq \xi(t) \leq \xi_{max} \quad (6)$$

$$\varsigma_{min} \leq \varsigma(t) \leq \varsigma_{max} \quad (7)$$

$$t_{f_{min}} \leq t_f \leq t_{f_{max}} \quad (8)$$

where $t_0$ is the constant initial time, $t_f$ is the variable final time $\xi(t) \in \mathbb{R}^{n_{st}}$ is the state and $n_{st}$ is the number of states $\zeta(t) \in \mathbb{R}^{n_{ctr}}$ is the control and $n_{ctr}$ is the number of controls, $\xi_0$ is the desired initial state vector, $\xi_{0_{tol}}$ is the initial state tolerance vector, $\xi_f$ is the desired final state vector, $\xi_{f_{tol}}$ is the final state tolerance vector, $\xi_{o_s}$ and $\xi_{f_s}$ are arrays of slack variables on the initial and terminal states, respectively, and $w_{s_o}$ and $w_{s_f}$ are arrays of weights.

Cost Functional

The cost functional of Eq. 1 may be given in Eq. 9, below as:

$$J = w_t t_f + w_g \frac{(x(t_f) - x_g)^2 + (y(t_f) - y_g)^2}{(x(t_o) - x_g)^2 + (y(t_o) - y_g)^2 + \epsilon} + \quad (9)$$

$$w_{haf} \int_{t_o}^{t_f} [\sin(\varphi_g)(y - y_g)]^2 dt +$$

$$w_{ce} \int_{t_o}^{t_f} w_{\delta_f} \delta_f(t)^2 + w_{sr} sr(t)^2 + w_{a_x} a_x(t)^2] dt +$$

$$w_{u_x} \int_{t_0}^{t_f} \frac{1}{u_x(t)^2 + \epsilon} dt + w_{s0}\xi_{0s} + w_{sf}\xi_{fs}$$

where, $w_t$, $w_g$, $w_{haf}$, $w_{ce}$, $w_{\delta_f}$, $w$, $w_{a_x}$, $w_{u_x}$, $w_{s0}$, $w_{sf}$ are constant weight terms, $x(t)$ and $y(t)$ are the vehicle's position coordinates, $x_g$ and $y_g$ are the goal's coordinates, $\varphi_g$ is a small number set to 0.01 to avoid singularities, g is the desired final heading angle, $\delta_f(t)$ and $sr(t)$ steering angle and rate, respectively, $ux(t)$ is the longitudinal speed, and $a_x(t)$ is the longitudinal acceleration.

As seen above, there are six terms within Eq. 9. The first term, $w_t t_f$, may minimize the final time. However, in a person or goal following system, if the vehicle travels too slowly, the system performance may not be as desired. If the trajectory planner 130 updates too quickly and the changes in the control signals are very small during the execution horizon, the vehicle may not move. Therefore, a minimum final time term makes the planner calculate more aggressive trajectories, which makes the vehicle more likely to move. The second term, $$w_g \frac{(x(t_f) - x_g)^2 + (y(t_f) - y_g)^2}{(x(t_o) - x_g)^2 + (y(t_o) - y_g)^2 + \epsilon},$$

facilitates pushing the final position of the vehicle closer to the goal. The third term, $w_{haf} \int_{t_o}^{t_f} [\sin(\varphi_g)(y-y_g)]^2 dt$, helps the vehicle travel toward the goal in a particular orientation. To accomplish this, the area between a line passing through the goal point $x_g$, $y_g$ at the desired goal angle $\varphi_g$ and the vehicle's x, y trajectory may be minimized. The fourth term, $w_{ce} \int_{t_o}^{t_f} w_{\delta_f} \delta_f(t)^2 + w_{sr} sr(t)^2 + w_{a_x} a_x(t)^2] dt$, minimizes the control effort. The fifth term, $$w_{u_x} \int_{t_0}^{t_f} \frac{1}{u_x(t)^2 + \epsilon} dt,$$

maximizes speed, which along with minimizing the final time, helps ensure that the vehicle moves. The sixth term, $w_{s0}\xi_{0s} + w_{sf}\xi_{fs}$, adds slack constraints on the initial and terminal conditions to help mitigating infeasible solutions.

Dynamic Constraints

The vehicle may be modeled using a nonlinear kinematic round vehicle model. The kinematic model may be used because when the vehicle moves at slow speeds, vehicle dynamics are not expected to significantly affect the vehicle's motion. According to one aspect, a kinematic and/or a dynamic bicycle model may be utilized to implement components of the system 100 for trajectory planning. However, the kinematic model may be less computationally expensive than the dynamic model. The dynamic constraints of Eq. 2 may be defined using the kinematic vehicle of Eq. 10 as:

$$\dot{x}(t) = u_x(t)\cos\left(\varphi(t) + \tan\left(\frac{l_a \tan(\delta_f(t))}{l_a + l_b}\right)^{-1}\right) \quad (10)$$

$$\dot{y}(t) = u_x(t)\sin\left(\varphi(t) + \tan\left(\frac{l_a \tan(\varphi_f(t))}{l_a + l_b}\right)^{-1}\right)$$

$$\dot{\varphi}(t) = \frac{u_x(t)\sin\left(\tan\left(\frac{l_a \tan(\varphi_f(t))}{l_a + l_b}\right)^{-1}\right)}{l_b}$$

$$\dot{u}_x(t) = a_x(t)$$

where $\varphi(t)$ may be the yaw angle, $l_a = 0.6$ m and $l_b = 0.6$ m may be wheelbase distances, for example.

Path Constraints

To avoid collisions with static and dynamic obstacles, time-varying hard constraints on the vehicles trajectory may be used to ensure that the vehicle's planned trajectory does not intersect with the obstacles' predicted trajectories. The path constraints in Eq. 3 may be given in Eq. 11 as:

$$\frac{(x(t) - (x0_{obs}[i] + v_x t))^2}{a_{obs}[i] + sm(t)} + \left(\frac{y(t) - (y0_{obs}[i] + v_y t)}{b_{obs}[i] + sm(t)}\right)^2 > 1, i \in 1:Q \quad (11)$$

where $$sm(t) = 0.45 + \frac{0.7 - 0.45}{t_f} t$$

describes the time-varying safety margin, $x0_{obs}[i]$ and $x0_{obs}[i]$ describe the position of the center of the ith obstacle at time t, $a_{obs}$, and $b_{obs}$ may be arrays of semi-major and semi-minor obstacles' axes, and Q may be the number of obstacles.

Figure 4:
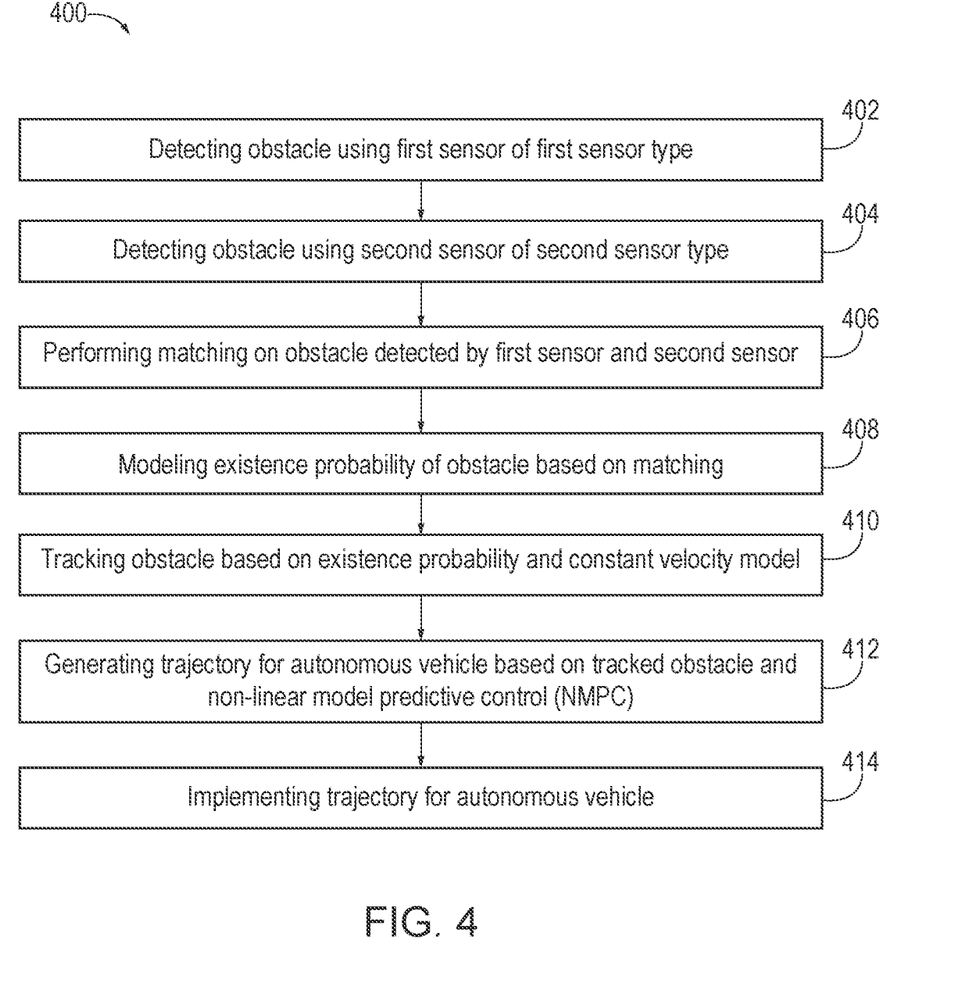
FIG. 4 is an exemplary flow diagram of a method for trajectory planning, according to one aspect.

FIG. 4 is an exemplary flow diagram of a method 400 for trajectory planning, according to one aspect. The method 400 for trajectory prediction may include detecting 402 an obstacle using a first sensor of a first sensor type, detecting 404 the obstacle using a second sensor of a second sensor type, the second sensor type different than the first sensor type, performing matching 406 on the obstacle detected by the first sensor and the obstacle detected by the second sensor via a processor 102, modeling an existence probability 408 of the obstacle based on the matching via the processor 102, tracking the obstacle 410 based on the existence probability and a constant velocity model via the processor 102, generating a trajectory 412 for an autonomous vehicle based on the tracked obstacle and a non-linear model predictive control (NMPC) via a trajectory planner 130, and implementing the trajectory 414 for the autonomous vehicle by driving one or more vehicle actuators 170 via a low-level controller 160.

Figure 5:
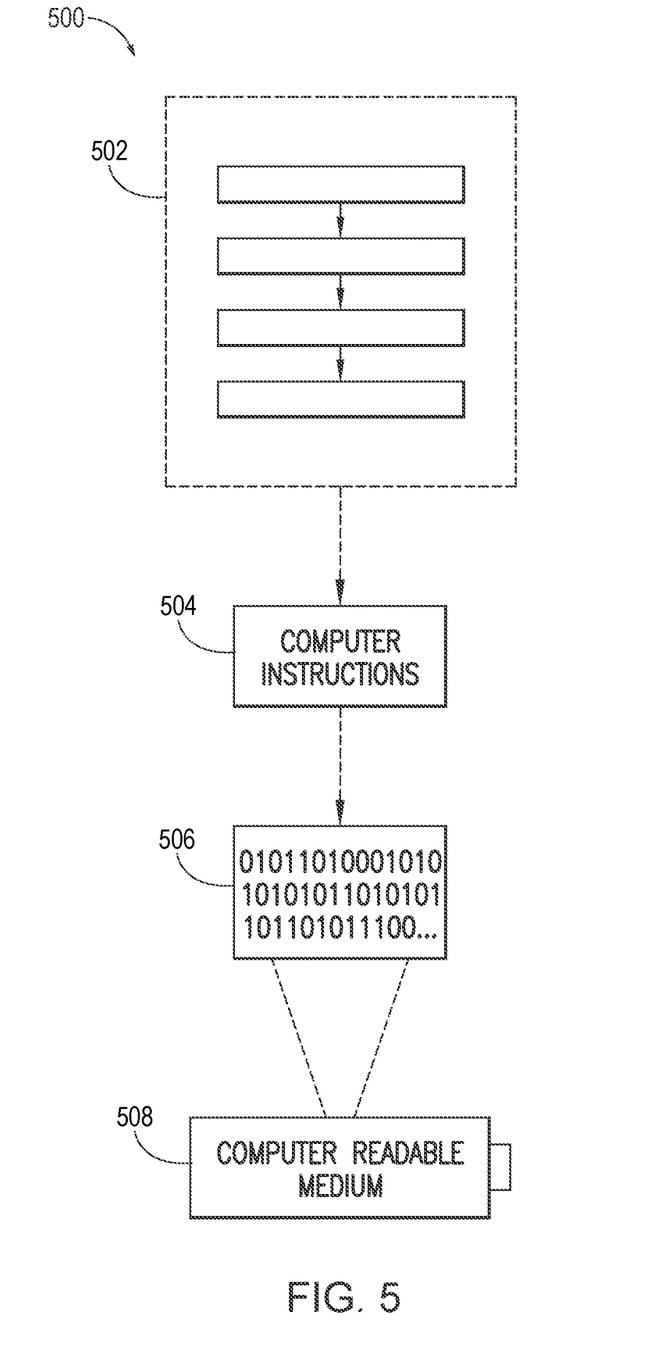
FIG. 5 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 5, wherein an implementation 500 includes a computer-readable medium 508, such as a CD-R, DVD-R, flash drive, a platter of a hard disk drive, etc., on which is encoded computer-readable data 506. This encoded computer-readable data 506, such as binary data including a plurality of zero's and one's as shown in 506, in turn includes a set of processor-executable computer instructions 504 configured to operate according to one or more of the principles set forth herein. In this implementation 500, the processor-executable computer instructions 504 may be configured to perform a method 502, such as the method 400 of FIG. 4. In another aspect, the processor-executable computer instructions 504 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 6:
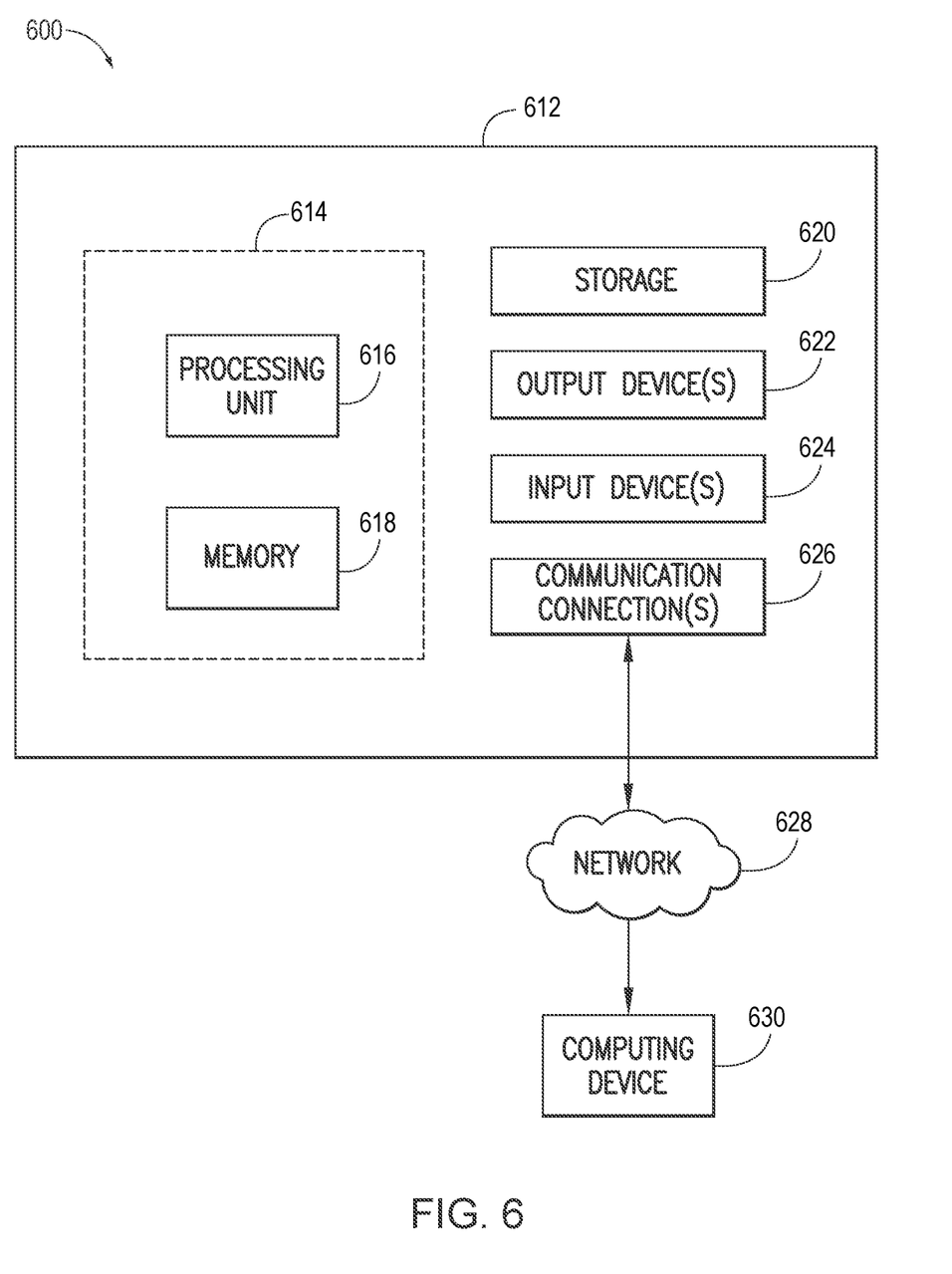
FIG. 6 is an illustration of an example computing environment where one or more of the provisions set forth herein are implemented, according to one aspect.

FIG. 6 and the following discussion provide a description of a suitable computing environment to implement aspects of one or more of the provisions set forth herein. The operating environment of FIG. 6 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 6 illustrates a system 600 including a computing device 612 configured to implement one aspect provided herein. In one configuration, the computing device 612 includes at least one processing unit 616 and memory 618. Depending on the exact configuration and type of computing device, memory 618 may be volatile, such as RAM, non-volatile, such as ROM, flash memory, etc., or a combination of the two. This configuration is illustrated in FIG. 6 by dashed line 614.

In other aspects, the computing device 612 includes additional features or functionality. For example, the computing device 612 may include additional storage such as removable storage or non-removable storage, including, but not limited to, magnetic storage, optical storage, etc. Such additional storage is illustrated in FIG. 6 by storage 620. In one aspect, computer readable instructions to implement one aspect provided herein are in storage 620. Storage 620 may store other computer readable instructions to implement an operating system, an application program, etc. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 612. Any such computer storage media is part of the computing device 612.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 612 includes input device(s) 624 such as keyboard, mouse, pen, voice input device, touch input device, infrared cameras, video input devices, or any other input device. Output device(s) 622 such as one or more displays, speakers, printers, or any other output device may be included with the computing device 612. Input device(s) 624 and output device(s) 622 may be connected to the computing device 612 via a wired connection, wireless connection, or any combination thereof. In one aspect, an input device or an output device from another computing device may be used as input device(s) 624 or output device(s) 622 for the computing device 612. The computing device 612 may include communication connection(s) 626 to facilitate communications with one or more other devices 630, such as through network 628, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for trajectory prediction, comprising:
a first sensor of a first sensor type detecting an obstacle and a goal;
a second sensor of a second sensor type detecting the obstacle and the goal, wherein the second sensor type is different than the first sensor type;
a processor performing matching on the obstacle detected by the first sensor and the obstacle detected by the second sensor,
wherein the processor models an existence probability of the obstacle based on the matching, and
wherein the processor tracks the obstacle based on the existence probability and a constant velocity model;
a trajectory planner generating a trajectory for an autonomous vehicle based on the tracked obstacle, the goal, and a non-linear model predictive control (NMPC); and
a low-level controller implementing the trajectory for the autonomous vehicle by driving one or more vehicle actuators,
wherein the matching is performed based on a cost function between the obstacle detected by the first sensor and the second sensor and the obstacle tracked by the processor, a cost of the cost function at least partially defined as a distance between a detection of each of the first sensor and the second sensor and the object, the cost function minimizing a time term for tracking the obstacle, facilitating a final position of the autonomous vehicle relative to the goal, and minimizing an area between the goal and the trajectory for the autonomous vehicle.

2. The system for trajectory prediction of claim 1, wherein the first sensor is an image capture sensor and the second sensor is a light detection and ranging (LiDAR) sensor.

3. The system for trajectory prediction of claim 1, wherein the matching is performed based on Hungarian matching.

4. The system for trajectory prediction of claim 1, wherein the existence probability is modeled based on a Bayesian function.

5. The system for trajectory prediction of claim 1, wherein the tracking is performed based on a Kalman filter.

6. The system for trajectory prediction of claim 1, wherein the NMPC is modeled based on a constant initial time, a variable final time, a state, a number of states, a control, a number of controls, a desired initial state vector, an initial state tolerance vector, a desired final state vector, a final state tolerance vector, arrays of slack variables on the initial states and terminal states, and arrays of weights.

7. The system for trajectory prediction of claim 1, wherein the cost function is calculated based on constant weight terms, vehicle position coordinates, goal coordinates, a number set associated with minimizing singularities, a desired final heading angle, a steering angle, a steering rate, a longitudinal speed, and a longitudinal acceleration.

8. The system for trajectory prediction of claim 1, wherein the low-level controller is a proportional-integral-derivative (PID) controller.

9. The system for trajectory prediction of claim 1, wherein the autonomous vehicle is a front-wheel-steered vehicle.

10. A method for trajectory prediction, comprising:
detecting an obstacle and a goal using a first sensor of a first sensor type;
detecting the obstacle and the goal using a second sensor of a second sensor type, wherein the second sensor type is different than the first sensor type;
performing matching on the obstacle detected by the first sensor and the obstacle detected by the second sensor via a processor,
modeling an existence probability of the obstacle based on the matching via the processor, and
tracking the obstacle based on the existence probability and a constant velocity model via the processor;
generating a trajectory for an autonomous vehicle based on the tracked obstacle, the goal, and a non-linear model predictive control (NMPC) via a trajectory planner; and
implementing the trajectory for the autonomous vehicle by driving one or more vehicle actuators via a low-level controller, wherein the matching is performed based on a cost function between the obstacle detected by the first sensor and the second sensor and the obstacle tracked by the processor, a cost of the cost function at least partially defined as a distance between a detection of each of the first sensor and the second sensor and the object, the cost function minimizing a time term for tracking the obstacle, facilitating a final position of the autonomous vehicle relative to the goal, and minimizing an area between the goal and the trajectory for the autonomous vehicle.

11. The method for trajectory prediction of claim 10, wherein the first sensor is an image capture sensor and the second sensor is a light detection and ranging (LiDAR) sensor.

12. The method for trajectory prediction of claim 10, wherein the matching is performed based on Hungarian matching.

13. The method for trajectory prediction of claim 10, wherein the existence probability is modeled based on a Bayesian function.

14. The method for trajectory prediction of claim 10, wherein the tracking is performed based on a Kalman filter.

15. The method for trajectory prediction of claim 10, wherein the NMPC is modeled based on a constant initial time, a variable final time, a state, a number of states, a control, a number of controls, a desired initial state vector, an initial state tolerance vector, a desired final state vector, a final state tolerance vector, arrays of slack variables on the initial states and terminal states, and arrays of weights.

16. The method for trajectory prediction of claim 10, wherein the cost function is calculated based on constant weight terms, vehicle position coordinates, goal coordinates, a number set associated with minimizing singularities, a desired final heading angle, a steering angle, a steering rate, a longitudinal speed, and a longitudinal acceleration.

17. The method for trajectory prediction of claim 10, wherein the low-level controller is a proportional-integral-derivative (PID) controller.

18. An autonomous vehicle capable of trajectory prediction, comprising:
   a first sensor of a first sensor type detecting an obstacle and a goal;
   a second sensor of a second sensor type detecting the obstacle and the goal, wherein the second sensor type is different than the first sensor type;
   a processor performing matching on the obstacle detected by the first sensor and the obstacle detected by the second sensor,
   wherein the processor models an existence probability of the obstacle based on the matching, and
   wherein the processor tracks the obstacle based on the existence probability and a constant velocity model;
   a trajectory planner generating a trajectory for the autonomous vehicle based on the tracked obstacle, the goal, and a non-linear model predictive control (NMPC); and
   a low-level controller implementing the trajectory for the autonomous vehicle by driving one or more vehicle actuators,
   wherein the matching is performed based on a cost function between the obstacle detected by the first sensor and the second sensor and the obstacle tracked by the processor, a cost of the cost function at least partially defined as a distance between a detection of each of the first sensor and the second sensor and the object, the cost function minimizing a time term for tracking the obstacle, facilitating a final position of the autonomous vehicle relative to the goal, and minimizing an area between the goal and the trajectory for the autonomous vehicle.

* * * * *